(12) United States Patent
Cutler (10) Patent No.: US 6,405,875 B1
(45) Date of Patent: Jun. 18, 2002

(54) WATER FILTRATION DEVICE AND METHOD

(75) Inventor: Willard A. Cutler, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/464,278

(22) Filed: Dec. 15, 1999

Related U.S. Application Data
(60) Provisional application No. 60/112,873, filed on Dec. 18, 1998.

(51) Int. Cl.[7] .............................................. B01D 24/00
(52) U.S. Cl. ...................... 210/477; 210/266; 210/282; 210/316; 210/335; 210/450; 210/455; 210/472; 210/482
(58) Field of Search ......................... 210/477, 473–474, 210/464, 466–467, 476, 450, 282, 510.1, 502.1, 455, 335, 314, 316–317, 472, 482, 435–436, 266; 55/523

(56) References Cited

U.S. PATENT DOCUMENTS

| | | | |
|---|---|---|---|
| 4,298,358 A | * | 11/1981 | Ruschke |
| 4,329,162 A | | 5/1982 | Pitcher, Jr. |
| 4,428,758 A | | 1/1984 | Montierth |
| 4,540,489 A | | 9/1985 | Barnard |
| 4,781,831 A | | 11/1988 | Goldsmith |
| 4,894,160 A | | 1/1990 | Abe et al. |

(List continued on next page.)

FOREIGN PATENT DOCUMENTS

| | | |
|---|---|---|
| EP | 0 745 416 | 12/1996 |
| EP | 0 792 676 | 9/1997 |
| GB | 2 197 647 | 3/1990 |
| WO | WO 96/31440 | 10/1996 |
| WO | WO-99/32212 A | * 7/1999 |
| WO | 99/32212 | * 7/1999 |

Primary Examiner—Matthew O. Savage
Assistant Examiner—Marianne Ocampo
(74) Attorney, Agent, or Firm—Kees van der Sterre (57) ABSTRACT

A gravity-flow cyst-reducing water filtration device, comprising a removable high surface area cyst-reducing filtration member that provides at least 99.95% removal of 3–4 μm particles when tested in accordance with NSF standard 53, Drinking Water Treatment Units—Health Effects (September 1997). The cyst-reducing filtration member is adapted for connection to a bottom rim of a filtration cartridge sleeve of a water filter carafe, the cartridge sleeve being integral with a bottom surface of an untreated water reservoir of the water filter carafe. The cartridge sleeve further comprises an air vent hole that is located proximate to a top rim of the cartridge sleeve, wherein the cartridge sleeve further contains a filtration cartridge that is filled with an ion-exchange resin and carbon granules. The filtration cartridge further has at least one untreated water inlet port located in a cap that is attached to the filtration cartridge at a top end, and at least one treated water outlet port located at a bottom end of the filtration cartridge, wherein the untreated water inlet port of the filtration cartridge is in fluid communication with the untreated water reservoir of the water filter carafe, and wherein the cyst-reducing filtration member is in fluid communication with the treated water outlet port of the filtration cartridge. Further, the water filtration device comprises a membrane that is adapted for attachment to the air vent hole. The membrane has at least one hydrophobic side, which hydrophobic side faces the inside of the cartridge sleeve upon attachment. The water filtration device further comprises sealing means for forming a water-tight seal between the cyst-reducing filtration member and the cartridge sleeve of the carafe.

7 Claims, 5 Drawing Sheets

U.S. PATENT DOCUMENTS

| | | | |
|---|---|---|---|
| 4,969,996 A | * 11/1990 | Hankammer | 210/282 |
| 4,981,464 A | * 1/1991 | Suzuki | |
| 5,009,781 A | 4/1991 | Goldsmith | |
| 5,076,922 A | * 12/1991 | Deare | 210/282 |
| 5,114,581 A | 5/1992 | Goldsmith et al. | |
| 5,128,036 A | 7/1992 | Svensson | |
| 5,167,819 A | * 12/1992 | Iana et al. | 210/474 |
| 5,198,007 A | 3/1993 | Moyer et al. | |
| 5,451,444 A | 9/1995 | DeLiso et al. | |
| 5,562,824 A | * 10/1996 | Magnusson | 210/266 |
| 5,597,617 A | 1/1997 | DeLiso et al. | |
| 5,782,383 A | * 7/1998 | Robinson | |
| 6,159,363 A | * 12/2000 | Collins et al. | 210/136 |
| 6,227,382 B1 | * 5/2001 | Cutler et al. | 210/473 |

* cited by examiner

WATER FILTRATION DEVICE AND METHOD

This application claims the benefit of U.S. Provisional Application No. 60/112,873, filed Dec. 18, 1998, entitled "Water Filtration Device and Method", by Willard A. Cutler.

FIELD OF THE INVENTION

The present invention relates to water filtration devices, which include a cyst-reducing water filter capable of reducing parasites and other impurities in drinking water and yet capable of delivering a substantial water flow rate at relatively low (gravity-assisted) water pressures. While the invention may be used in other types of water filtration devices, it is especially suited for use in existing gravity-flow water carafes, and will be particularly described in that connection.

BACKGROUND OF THE INVENTION

Until recently, water filter carafes of commercially available design have not been capable of parasite reduction, which requires much finer filtration. Nor have they been effective for the significant reduction of organic chemicals, pesticides and insecticides, which requires more carbon. While such additional removal attributes are desirable, they have not been technically feasible in the filter sizes required and at the filter cost currently available in the market. In addition to the concerns about drinking water taste and odor, consumers are beginning to be more concerned with the quality of drinking water, thus increasing the demand for gravity-flow filter carafes. This is because such water filter carafes are relatively low in cost and operate in a simple manner. Water from a tap is simply poured into the top of the filtration unit and is allowed to flow through a replaceable filter cartridge to a treated water reservoir for later use. A typical commercially available cyst-reducing water filter cartridge consists of a filter housing which contains a packed bed mixture of ion-exchange resin for the removal of unwanted ions, for example, lead, copper, and hard water ions, as well as carbon granules for the removal of adsorbable/catalyzable constituents such as chlorine and undesirable tastes and odors. Further, the filter housing contains a high surface area cyst-reducing filter element that is capable of removing harmful parasites and dirt that are present in water from a municipal water source. Without the cyst-reducing filter element, the housing containing the packed bed mixture that is commercially available for use in gravity-flow water carafes typically have physical volumes on the order of 165 cm$^3$ (10 in$^3$). This suggests that a filter incorporating the additional cyst function using the current designs would require more volume than that mentioned above. Gravity cyst-reducing filters should be able to achieve the production of a reasonable quantity of filtered water in a reasonable time, preferably, approximately 1 liter in less than 12 minutes.

Although filter designs and materials capable of effective cyst reduction exist, many households currently utilize water carafes that are not capable of cyst reduction. Consumers who have already invested in a water filter carafe that is capable of filtering out lead, copper and zinc as well as removing undesirable tastes and odors are reluctant to discard their existing water filter carafe for a more recently available cyst-reducing filter, since they would lose their original investment and moreover add to already overcrowded landfills.

In light of the foregoing, it is desirable to provide a cyst-reducing water filtration device that can be used in conjunction with an existing carafe system and that can deliver an adequate filter flow rate at relatively low (gravity-flow or gravity-assisted) water pressures. In addition, it is desirable to provide a water filtration device that can be easily attached to an existing water filter carafe in order to convert the carafe to an effective cyst-reducing water filter carafe, providing at least 99.95% removal of 3–4 μm particles from a raw water source when tested in accordance with NSF Standard 53, Drinking Water Treatment Units—Health Effects (September 1997). Furthermore, it is desirable to provide a replaceable and affordable water filtration device for reducing cysts in drinking water as well as a filtration device that can be separated from the other components of the filtration device.

SUMMARY OF THE INVENTION

Accordingly, the present invention is directed to a water filtration device and a method of converting a gravity-flow water filtration device into a cyst-reducing water filtration device that substantially obviates one or more of the limitations and disadvantages of the related art. The principal advantage of the present invention is the provision of an arrangement that overcomes the limitations and disadvantages of the described prior arrangements. Additional features and advantages of the invention will be set forth in the description that follows, and in part will be apparent from the description, or may be learned by practice of the invention. The objectives and other advantages of the invention will be realized and attained by the apparatus particularly pointed out in the written description and claims hereof as well as the appended drawings.

To achieve these and other advantages and in accordance with the purpose of the invention, as embodied and broadly described, the water filtration device is a replaceable gravity-flow cyst-reducing water filtration member for use in a water filter carafe that already has the capability of removing tastes and odors. In particular, the water filtration device comprises a removable high surface area cyst-reducing filtration member that provides at least 99.95% removal of 3–4 μm particles when tested in accordance with NSF standard 53, Drinking Water Treatment Units—Health Effects (September 1997). The cyst-reducing filtration member is adapted for connection to a bottom rim of a filtration cartridge sleeve of a water filter carafe, the cartridge sleeve being integral with a bottom surface of an untreated water reservoir of the water filter carafe. The cartridge sleeve further comprises an air vent hole that is located proximate to a top rim of the cartridge sleeve, wherein the cartridge sleeve further contains a filtration cartridge that is filled with an ion-exchange resin and carbon granules. The filtration cartridge further has at least one untreated water inlet port located in a cap that is attached to the filtration cartridge at a top end, and at least one treated water outlet port located at a bottom end of the filtration cartridge, wherein the untreated water inlet port of the filtration cartridge is in fluid communication with the untreated water reservoir of the water filter carafe, and wherein the cyst-reducing filtration member is in fluid communication with the treated water outlet port of the filtration cartridge. Further, the water filtration device comprises a membrane that is adapted for attachment to the air vent hole. The membrane has at least one hydrophobic side, which hydrophobic side faces the inside of the cartridge sleeve upon attachment. The water filtration device further comprises sealing means for forming a water-tight seal between the cyst-reducing filtration member and the cartridge sleeve of the carafe.

In one embodiment of the invention, the sealing means comprises a gasket that is permanently attached to the outside periphery of the cyst-reducing filtration member to provide a water-tight seal. In another embodiment of the invention, the sealing means comprises an annular member with an upper surface and a lower surface and a gasket, wherein the annular member is permanently connected to the outside periphery of the cyst-reducing filtration member, and wherein the gasket abuts against the annular member. In yet another embodiment, the sealing means comprises an annular rim attached proximate to a topmost surface of the high surface area cyst-reducing filtration member, wherein the annular rim has an upright edge extending above a topmost surface of the high surface area cyst-reducing filtration member, and wherein the upright edge is adapted to receive the bottom rim of the cartridge sleeve. In a further embodiment, the sealing means further comprises an annular member with an integral groove and a gasket, wherein the annular member is permanently connected to the outside periphery of the cyst-reducing filtration member, and wherein the gasket is securely placed within the groove of the annular rim.

In each of the preferred embodiments, the removable high surface area cyst-reducing filtration member comprises a cellular honeycomb structure having a plurality of channels separated by porous channel walls, wherein the channels traverse the filtration member from a cyst-filled water inlet end to a cyst-removed water outlet end, and include a first plurality of channels open only at the cyst-filled water inlet end and a second plurality of channels open only at the cyst-removed water outlet end, and where the cellular honeycomb structure is made of ceramic. In an alternative embodiment, the cellular ceramic honeycomb structure further comprises activated carbon.

Furthermore, a method is provided for converting a gravity-flow water filtration carafe into a cyst-reducing water filtration carafe. In particular, the invention provides a method of converting a gravity-flow water filtration carafe having an integrally molded filtration cartridge sleeve containing a cartridge with an ion-exchange resin and carbon granules into a gravity-flow cyst-reducing filtration carafe. The cartridge sleeve includes an air vent hole proximate to a top rim of the cartridge sleeve. The method comprises the steps of connecting a high surface area cyst-reducing filtration member that provides at least 99.95% removal of 3–4 $\mu$m particles when tested in accordance with NSF standard 53, Drinking Water Treatment Units—Health Effects (September 1997) to a bottom rim of the filtration cartridge sleeve, forming a water-tight seal between the filtration cartridge sleeve and the high surface area cyst-reducing filtration member and securing a membrane having at least one hydrophobic side across the air vent hole. In the preferred embodiment, the step of connecting involves connecting a cellular honeycomb structure having a plurality of channels separated by porous channel walls, wherein each of the channels traverse the structure from a cyst-filled water inlet end to a cyst-removed water outlet end, and include a first plurality of channels open only at the cyst-filled water inlet end and a second plurality of channels open only at the cyst-removed water outlet end. Further, the step of securing preferably includes positioning the hydrophobic side of the membrane toward the inside of said cartridge sleeve. Furthermore, in one embodiment of the invention, the step of forming a water-tight seal further comprises permanently attaching a gasket to the outside periphery of the cyst-reducing filtration member and inserting the cyst-reducing filtration member into the bottom rim of the cartridge sleeve. In another embodiment of the invention, the step of forming a water-tight seal farther comprises permanently attaching an annular member with an upper surface and a lower surface, and abuttingly placing a gasket against the upper surface of the annular member. In yet another embodiment, the step of forming a water-tight seal further comprises permanently attaching an annular member with an upper surface and a lower surface, and abuttingly placing a gasket against the lower surface of the annular member. In a further embodiment, the step of forming a water-tight seal further comprises attaching an annular member having an integral groove to the outside periphery of said cyst-reducing filtration member, and placing a gasket within said integral groove. Finally, in yet another embodiment of the invention, the step of forming a water-tight seal further comprises attaching an annular rim having an upright edge extending from a topmost surface of the high surface area cyst-reducing filtration member, and positioning the upright edge around the exterior surface of the bottom rim of the cartridge sleeve to form a water-tight seal.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrating embodiments of the invention, and together with the description serve to explain the objects, advantages, and principles of the invention.

DESCRIPTION OF THE PREFERRED EMBODIMENTS

The invention disclosed herein generally embodies the provision of a water filtration device containing a cyst-reducing water filtration cartridge. More specifically, an aspect of the invention resides in providing a replaceable cyst-reducing water filtration cartridge for existing carafe systems that do not currently have such cyst-reduction capabilities and that can provide an adequate filtration water flow rate at relatively low (gravity-flow or gravity-assisted) water pressures. As used herein, the terms "gravity-flow" and "gravity-assisted" refer to the natural downward flow of water aided by gravity alone. Furthermore, the term "cyst-reducing filter" refers to a filter that provides at least 99.95% removal of 3–4 $\mu$m particles when tested in accordance with NSF Standard 53, Drinking Water Treatment Units—Health Effects (September 1997).

Figure 1:
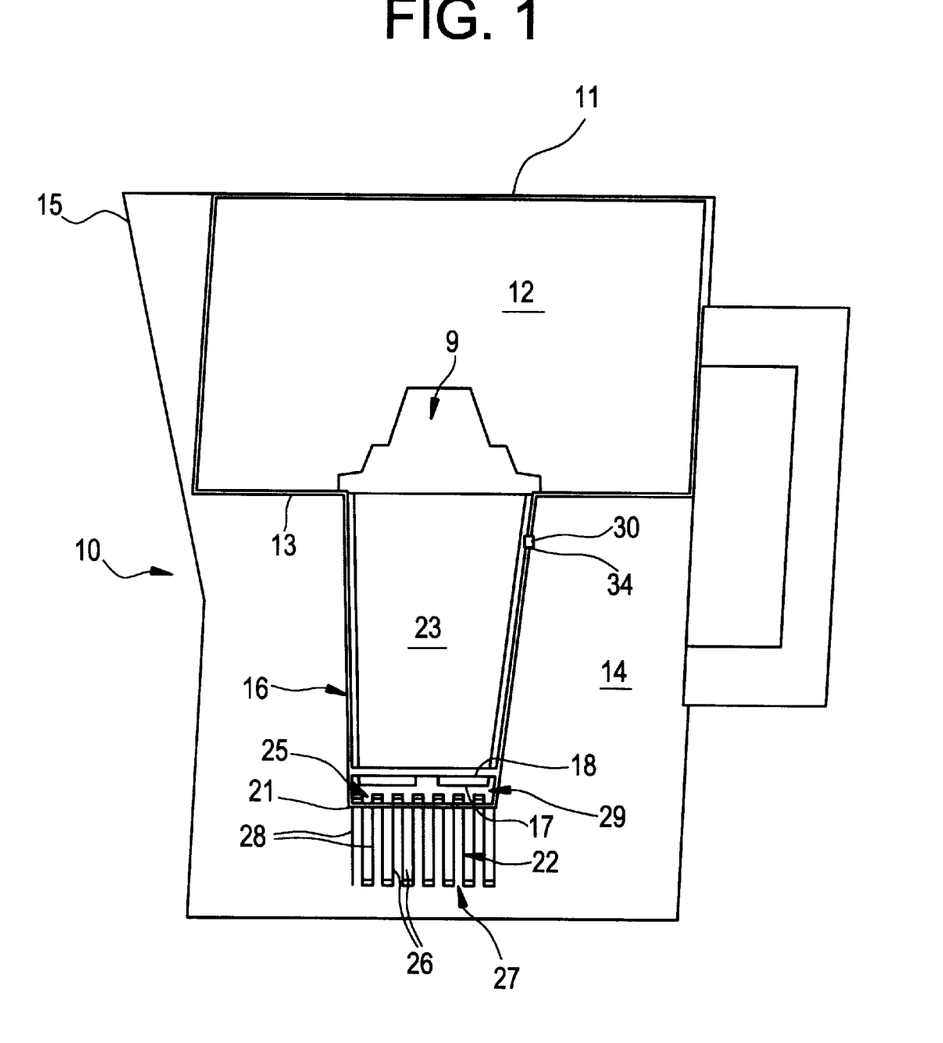
FIG. 1 is a side view of a filter cartridge-carafe design in accordance with an embodiment of the present invention.

Reference will now be made in detail to the present preferred embodiments of the invention, examples of which are illustrated in the accompanying drawings. Turning to the drawings, like numerals indicate the same or similar elements in each of the several views. The drawings are not intended to indicate scale or relative proportions of the elements shown therein. FIG. 1 depicts a commercially available water carafe incorporating the cyst-reducing filtration cartridge of the present invention. The water carafe is designated generally by reference numeral 10. As shown in FIG. 1, the water carafe 10 comprises an untreated water reservoir 12 positioned proximate to a top surface 11 of the carafe 10 and a treated water reservoir or pitcher 14 below and adjacent to the untreated water reservoir 12. Further, the untreated water reservoir 12 has an integral filtration cartridge sleeve 16 extending from a bottom surface 13 of the untreated water reservoir 12, with the filtration cartridge sleeve 16 extending into the treated water reservoir 14 and being in fluid communication with the treated water reservoir 12. The filtration cartridge sleeve 16 has a removable filtration cartridge 23 inserted inside the cartridge sleeve 16. The filtration cartridge 23 contains a packed bed of ion-exchange resin for the removal of unwanted ions, for example, lead, copper, and hard water ions, as well as carbon granules for the removal of adsorbable/catalyzable constituents such as chlorine and undesirable tastes and odors. The filtration cartridge 23 further has at least one untreated water inlet port 19 (not shown) located in a cap 9 at the top end of the filtration cartridge 23 and has at least one treated water outlet port 20 (also not shown) at a bottom end 17 of the filtration cartridge 23. The untreated water inlet port 19 is in fluid communication with the untreated water reservoir 12 and the treated water outlet port 20 is in fluid communication with a bottom rim 21 of the cartridge sleeve 16. As shown in FIG. 1, the cartridge sleeve 16 has an integral cross structure 18 that is proximate to the bottom rim 21 of the cartridge sleeve 16. The bottom end 17 of the filtration cartridge 23 is adapted to fit through the integral cross structure 18, whereby the bottom end 17 of the filtration cartridge 23 extends beyond the integral cross structure 18, and is proximate to the bottom rim 21 of the filtration cartridge sleeve 16. Furthermore, a detachable high surface area cyst-reducing filtration member 22 is connected proximate to the bottom rim 21 of the filtration cartridge sleeve 16, as shown in FIGS. 1–4. There is a space 29 between the bottom end 17 of the filtration cartridge 23 and a topmost surface 31 of the cyst-reducing filtration member 22. The filtration member 22 is sealingly attached to the filtration cartridge sleeve 16 by sealing means, which is designated generally by the numeral 24, and is shown in detail in FIGS. 2–4. The sealing means 24 forms a watertight seal between the filtration cartridge sleeve 16 and the filtration member 22. Additionally, the cartridge sleeve 16 also has an air vent hole 30 located approximately in the top half portion of the cartridge sleeve 16, proximate to the bottom surface 13 of the untreated water reservoir 12. The air vent hole 30 further comprises a membrane 34 that covers the air vent hole 30. The membrane 34 is made up of at least one hydrophobic side, which hydrophobic side is positioned facing the inside of the filtration cartridge sleeve 16.

The way that the water carafe 10 operates after the filter has been assembled, is that before the first use, the treated water reservoir or pitcher 14 is partially filled with water and the untreated water reservoir 12 with integral sleeve 16 and attached filters is placed in the pitcher 14. Water enters the cyst element 22, flowing in a reverse manner up through the element pushing air out before it. The water in the cartridge sleeve 16 rises to the level that allows the bed mixture contained in the filtration cartridge 23 to soak in water in preparation for ion exchange. After this short soaking set the water in the pitcher is discarded and the untreated water reservoir 12 is filled with water from a faucet. In general, the untreated water reservoir 12 comprises an enclosed area that has an opening (not shown) at the top of the carafe 10 for receiving water from a raw water source, such as a faucet and which carafe 10 has the integral filtration cartridge sleeve 16 extending from the bottom surface 13 of the untreated water reservoir 12. Under the influence of gravity, the water flows down through the cartridge sleeve 16 and, in particular, through the filtration cartridge 23, which is located inside and which contains a mixture of carbon granules, for removing tastes and odors, and an ion-exchange resin mixture for the removal of metal ions such as lead, copper, zinc and hard water ions. After the water passes through the filtration cartridge 23, the water passes into the cyst-reducing filtration member 22. Since the pores in the cyst-reducing filtration member 22 are very fine, there can be a buildup of back-pressure as the water flows through the cyst-reducing filtration member 22, which can cause the water level within the cartridge sleeve 16 to rise to a level above that of the air vent hole 30. Without a membrane 34 which covers the air vent hole 30, especially with the hydrophobic side of the membrane 34 facing the inside of the cartridge sleeve 16, any water that has risen above the air vent hole 30 can leak through the air vent hole 30 and into the treated water reservoir 14, thus, causing contamination. The hydrophobic side of the membrane 34 facing the inside of the cartridge sleeve 16 ensures that only air and not any cyst-filled water escapes through the vent hole 30 and membrane 34, thus, preventing contamination of the water in the treated water reservoir 14. Moreover, as shown in FIG. 1, the treated water reservoir 14 is integral with a pour spout 15 of the carafe 10, so that the filtered water in the treated water reservoir 14 may directly be poured out of the carafe 10.

In the preferred embodiments, the cyst-reducing filtration member 22 comprises a cellular honeycomb structure that includes a plurality of channels 26, which are separated by porous channel walls 28. The channels 26 traverse the cyst-reducing filtration member 22 from a cyst-filled water inlet end 25 to a cyst-removed water outlet end 27 and include a first plurality of channels 26a that are open only at the cyst-filled water inlet end 25 and a second plurality of channels 26b that are open only at the cyst-removed water outlet end 27. Thus, the water leaving the filtration cartridge 23 enters the cyst-reducing filtration member 22 through the first plurality of channels 26a, which are open only at the cyst-filled water inlet end 25 and the water exits through the second plurality of channels 26b, which are open only at the cyst-removed water outlet end 27. Although in each of the preferred embodiments, the cyst-reducing filtration element 22 is a cellular honeycomb structure, the cyst-reducing filtration element 22 may be formed of any of a variety of different micro-porous materials that offer porosity sufficiently fine to provide effective cyst reduction. More importantly, the micro-porous cyst-reducing filtration element 22 must offer a high surface area in order to ensure adequate water filtration rates under gravity conditions alone. For instance, in the present invention, the cyst-reducing filtration element 22 achieves cyst reduction mainly due to the characteristics of the walls 28 of the channels 26 that traverse the cyst-reducing filtration element 22. More specifically, the walls 28 of the channels 26 are configured to have a porosity characterized by a median pore diameter of less than 6 microns (as measured by mercury intrusion), and a primed water flux of at least about 10 ml/min/cm$^3$ under a water pressure of 0.3 psig. Some desirable materials that the cyst-reducing filtration element 22 may be formed of include porous ceramics, porous carbon, composite materials of organic/organic, organic/inorganic, inorganic/inorganic composition and polymer or molecular sieve membranes, each of which can provide at least 99.95% removal of 3–4 $\mu$m particles when tested in accordance with NSF standard 53, Drinking Water Treatment Units—Health Effects (September 1997). In particular, the micro-porous filters known to be effective for cyst reduction during water filtration are ceramic honeycomb filters, carbon-based honeycomb filters, fiber mat filters incorporating glass, ceramic and/or polymer fibers, and pleated polymer membrane filters. In another preferred embodiment, the cyst-reducing filtration element 22 is a cellular ceramic honeycomb structure that further consists of more than 15% by weight of activated carbon. Alternatively, the cellular ceramic honeycomb structure can be coated with carbon.

With respect to the membrane 34, although, the membrane 34 with only one hydrophobic side will suffice, alternatively, the membrane 34 can have two sides that are hydrophobic. Further, the membrane 34 may be made of any hydrophobic material that allows air to escape through the membrane 34, but prohibits water from passing through it. In the preferred embodiment, the material sold under the brand name of GORE-TEXT® is used for the membrane 34, which is attached using an adhesive, preferably of the self-stick type. However, other suitable materials may be substituted by one skilled in the art.

Figure 2:
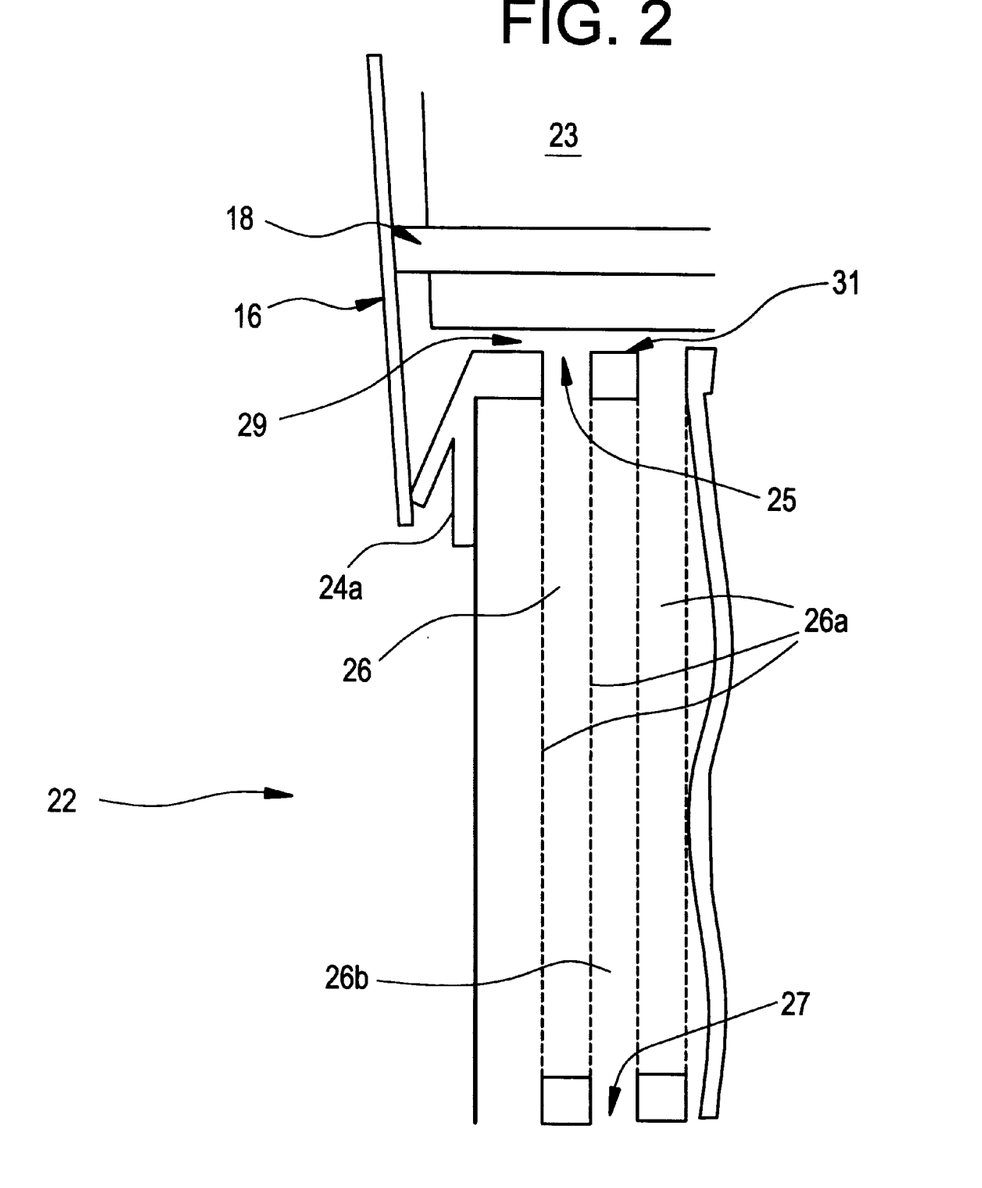
FIG. 2 is a partial cross-sectional view of the filter cartridge of FIG. 1 in accordance with an embodiment of the present invention.

Of significance, is the sealing means 24, which forms a water-tight seal between the detachable cyst-reducing filtration member 22 and the cartridge sleeve 16, thus, preventing any contamination of the treated water reservoir 14 and providing a filtration cartridge 10 that provides at least 99.95% removal of 3–4 $\mu$m particles present in water from a faucet when tested in accordance with NSF standard 53, Drinking Water Treatment Units—Health Effects (September 1997). The various embodiments of the sealing means 24, shown in FIGS. 2–5, demonstrate that the sealing means 24 can form a seal with and cause attachment to occur with either the interior surface or the exterior surface of the cartridge sleeve 16. In one embodiment of the sealing means 24, as shown in FIG. 2, the sealing means 24 is a gasket 24a that is permanently attached to the outside periphery of the cyst-reducing filtration member 22. In particular, as shown in FIG. 2, the cyst-reducing filtration member 22 with the permanently attached gasket 24a is inserted into the bottom rim 21, so that the topmost surface 31 of the cyst-reducing filtration member 22 is proximate to the integral cross structure 18 of the filtration cartridge sleeve 16. Also, upon insertion of the cyst-reducing filtration member 22, the gasket 24a comes in full contact with the inside surface of the cartridge sleeve 16, thus, preventing the bypass of any cyst-filled water into the treated water reservoir 14.

Figure 3:
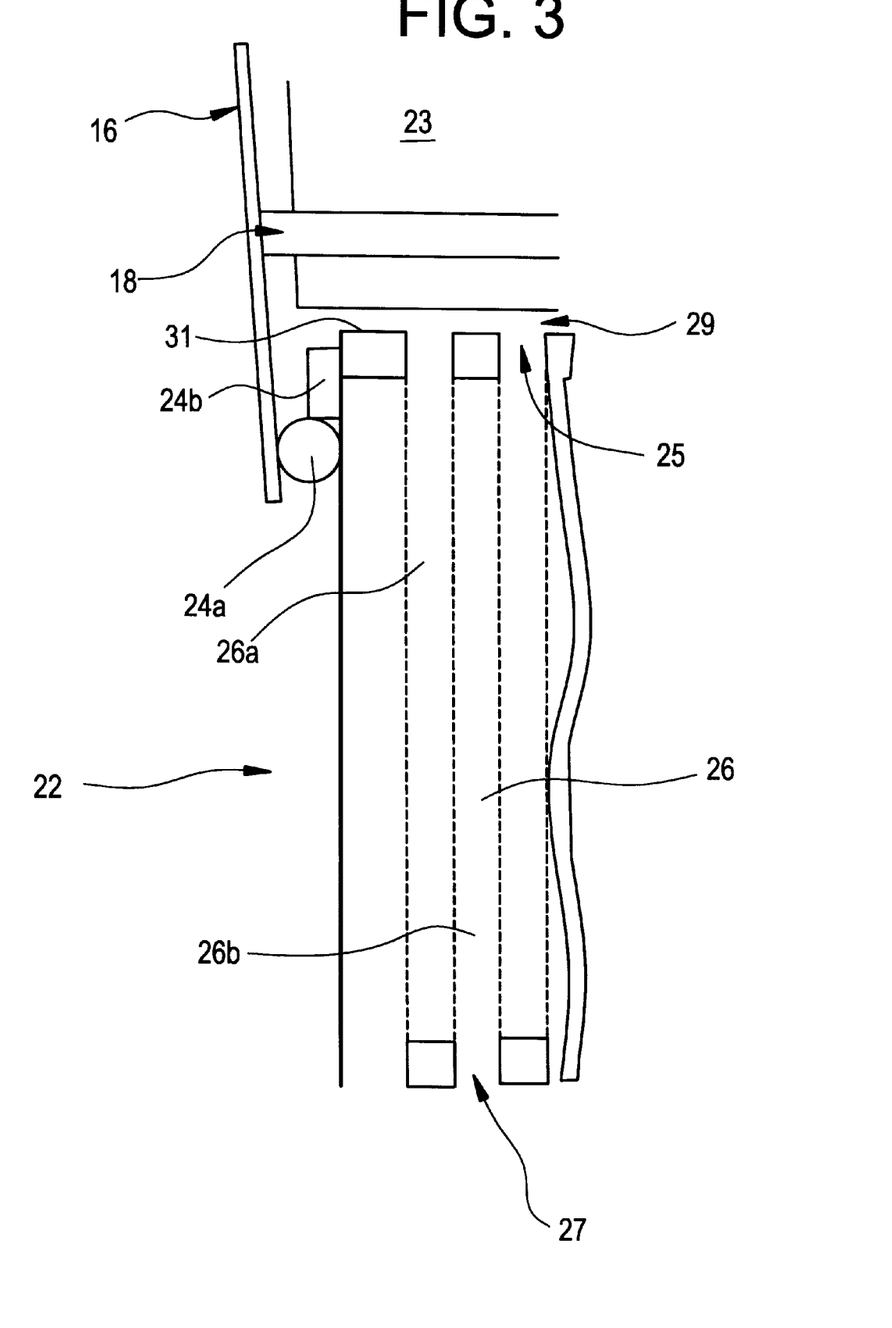
FIG. 3 is a partial cross-sectional view of the filter cartridge of FIG. 1 in accordance with an embodiment of the present invention.
Figure 4:
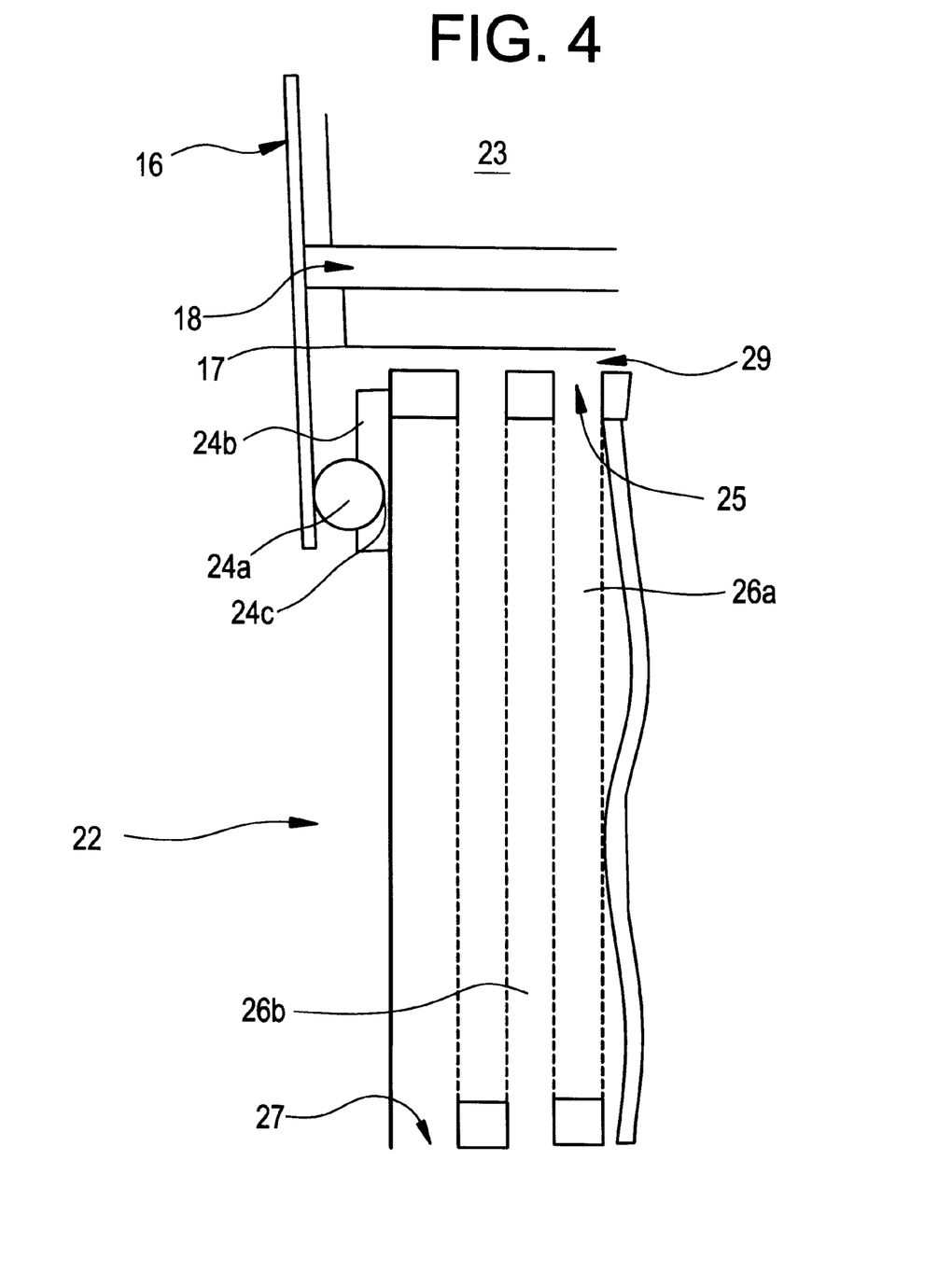
FIG. 4 is a partial cross-sectional view of the filter cartridge of FIG. 1 in accordance with an embodiment of the present invention.
Figure 5:
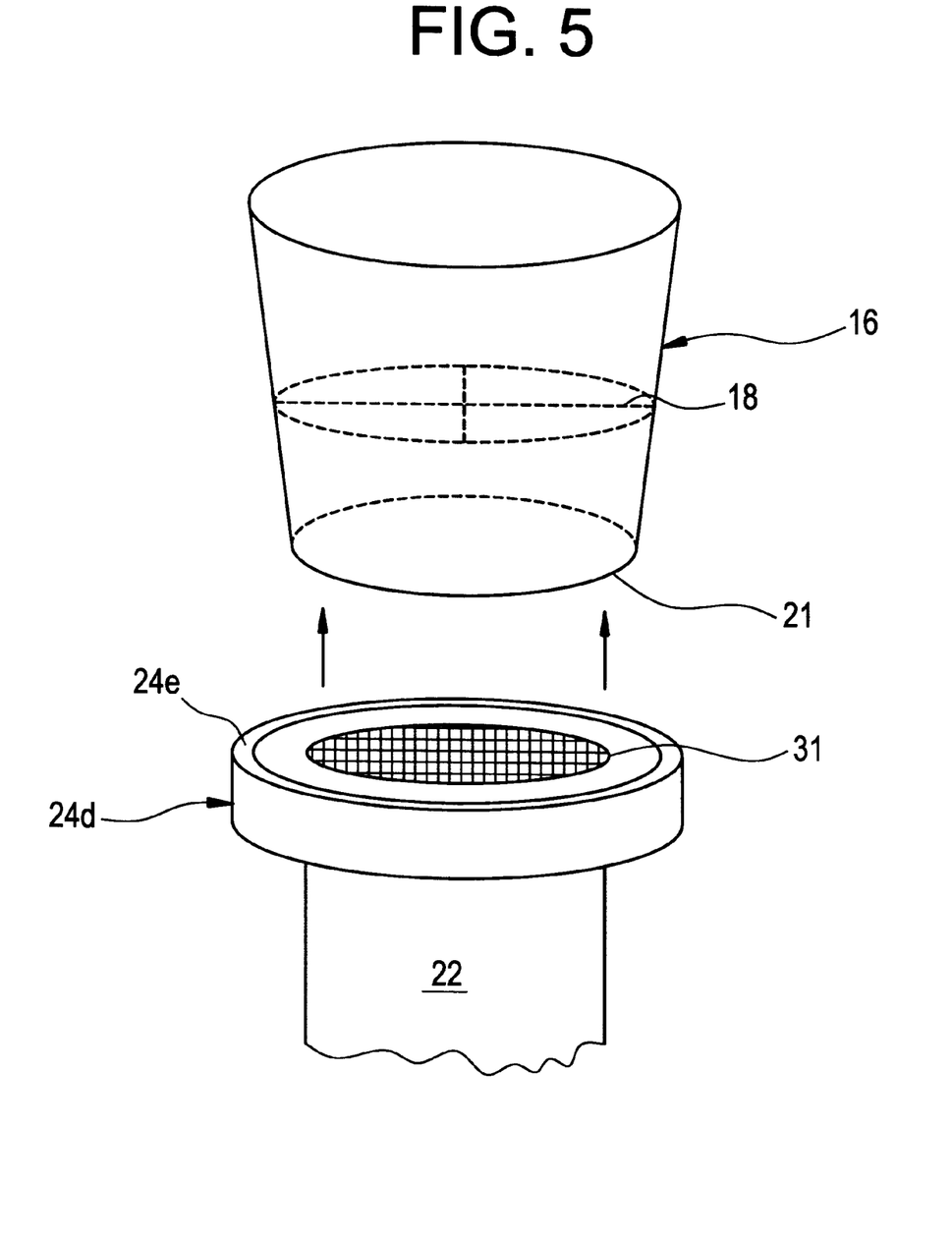
FIG. 5 is a partial elevational view of a filter cartridge of FIG. 1 in accordance with an embodiment of the present invention.

In another embodiment of the invention, as shown in FIG. 3, the sealing means 24 comprises an annular member 24b having an upper surface and a lower surface that is permanently connected to the outside periphery of the cyst-reducing filtration member 22. Further, the sealing means 24 comprises a replaceable gasket 24a that is placed around the outside periphery of the cyst-reducing filtration member 22 and securely placed against either the upper surface or the lower surface of the annular member 24b, whereby, the annular member 24b holds the gasket 24a in place, again, impeding any cyst-filled water from bypassing the cyst-reducing filtration member 22. To further facilitate the holding of the gasket 24a in place, in yet another embodiment as shown in FIG. 4, the annular member 24b is provided with an integral groove 24c which is adapted to securely hold a gasket 24a in place, hence providing a water-tight seal between the cartridge sleeve 16 and the cyst-reducing filtration member 22. Finally, in another embodiment, as shown in FIG. 5, the sealing means 24 comprises an annular rim 24d that is permanently attached proximate to the topmost surface 31 of the cyst-reducing filtration member 22. The annular rim 24d has an upright edge 24e that protrudes above the topmost surface 31 of the cyst-reducing filtration member 22, so that the cartridge sleeve 16 can be inserted into the edge 24e of the annular rim 24d, thus, forming a water-tight seal between the exterior surface of the cartridge sleeve 16 and the interior surface of the upright edge 24e of the cyst-reducing filtration member 22. In each of the embodiments shown in FIGS. 2–5, the sealing means 24 is attached using an adhesive, heat or chemical means and the membrane 34 is attached over the air vent hole 30 located on the cartridge sleeve 16 using an adhesive, preferably of the self-stick type. Alternatively, the sealing means 24 can comprise a viscous sealant that provides a watertight seal between the filtration cartridge sleeve 16 and the cyst-reducing filtration member 22.

The invention further includes a method of making the apparatus described herein, In particular, a method is provided for converting a gravity-flow water filtration carafe 10 having an integrally molded filtration cartridge sleeve 16, which contains a filtration cartridge 23 and has an air vent hole 30 into a gravity-flow cyst-reducing filtration carafe 10. The filtration cartridge 23 further contains an ion-exchange resin mixture for the removal of metal ions such as lead, copper, zinc and hard water ions and carbon granules for the removal of tastes and odors. The method comprises the steps of connecting, to the bottom rim 21 of the filtration cartridge sleeve 16, a high surface area cyst-reducing filtration member 22 that provides at least 99.95% removal of 3–4 $\mu$m particles when tested in accordance with NSF standard 53, Drinking Water Treatment Units—Health Effects (September 1997). The method further includes forming a water-tight seal between the filtration cartridge sleeve 16 and the high surface area cyst-reducing filtration member 22, and further securing a membrane 34 having at least one hydrophobic side across the air vent hole 30. In one embodiment of the invention, the method provides for connecting, to the bottom rim 21 of the cartridge sleeve 16, a cyst-reducing filtration member 22 that has a cellular honeycomb structure having a plurality of channels 26 that are separated by porous channel walls 28, where each of the channels 26 traverse the structure from a cyst-filled water inlet end 25 to a cyst-removed water outlet end 27, and include a first plurality of channels 26a open only at the cyst-filled water inlet end 25 and a second plurality of channels 26b open only at the cyst-removed water outlet end 27. In another embodiment, the cellular honeycomb structure can be made entirely of ceramic. Alternatively, the cellular honeycomb structure can comprise a cellular ceramic honeycomb structure that further includes activated carbon. Furthermore, the invention provides for positioning the hydrophobic side of the membrane 34 toward the inside of the filtration cartridge sleeve 16 when securing the membrane 34 across the air vent hole 30. Alternatively, a membrane 34 having two hydrophobic sides can be placed across the air vent hole 30 in the method. Finally, the method provides for forming a water-tight seal by permanently attaching a gasket 24a to the outside periphery of the cyst-reducing filtration member 22, as shown in an embodiment of the invention in FIG. 2. A variation of the method for forming a water-tight seal involves connecting a high surface area cyst-reducing filtration member 22 with a permanently attached annular member 24b having an upper surface and a lower surface on the outside periphery of the filtration member 22 and placing a gasket 24a against either the upper surface or the lower surface of the annular member 24b. In yet another variation for forming a water-tight seal, the method provides for connecting a high surface area cyst-reducing filtration member 22 having an annular member 24b with an integral groove 24c permanently attached to the outside periphery of the filtration member 22 and placing a gasket 24a within the integral groove 24c to form a water tight seal. In another preferred method of converting a gravity-flow water filtration carafe into a cyst-reducing filtration carafe, the cartridge sleeve 16 is inserted into a cyst-reducing filtration element 22 that has a permanently attached annular rim 24d with an upright edge 24e that protrudes above the topmost surface 31 of the cyst-reducing filtration member 22, whereby, the edge 24e of the annular rim 24d is securely positioned around the bottom rim 21 of the cartridge sleeve 16, thus, forming a water-tight seal between the exterior surface of the cartridge sleeve 16 and the cyst-reducing filtration member 22.

In the preferred embodiments, all of the parts of the filtration cartridge sleeve 16 are made of an injection moldable or castable plastic material. The water-tight attachment of the various forms of the cyst-reducing element 22 to the filtration cartridge sleeve 16 is accomplished by using a commercially available compressible polymer. Furthermore, in the filtration cartridge 23, any ion-exchange resin mixture that is capable of removing metal ions such as lead, copper, zinc and hard water ions will be sufficient, for instance, a macroporous weak acid ion exchange resin combined with high surface area carbon granules.

Although a preferred embodiment of this invention and certain variations thereof have been described herein, various modifications and variations will be apparent to those skilled in the art without departing from the spirit or scope of the invention. Thus, it is intended that the present invention cover the modifications and variations of this invention provided they come within the scope of the appended claims and their equivalents.

What is claimed is:

1. A gravity-flow cyst-reducing water filtration device, comprising, in combination:
   a removable high surface area cyst-reducing filtration member that provides at least 99.95% removal of 3–4 μm particles when tested in accordance with NSF standard 53, Drinking Water Treatment Units—Health Effects (September 1997), said cyst-reducing filtration member being connected to a bottom rim of a filtration cartridge sleeve of a water filter carafe, said cartridge sleeve being integral with a bottom surface of an untreated water reservoir of said water filter carafe, wherein said cartridge sleeve further comprises an air vent hole located proximate to a top rim of said sleeve, and wherein said sleeve further contains a filtration cartridge that is filled with an ion-exchange resin and carbon granules, said filtration cartridge further having at least one untreated water inlet port located in a cap that is attached to said filtration cartridge at a top end, and at least one treated water outlet port located at a bottom end of said filtration cartridge, wherein said untreated water inlet port of said filtration cartridge is in fluid communication with said untreated water reservoir of said water filter carafe, and wherein said cyst-reducing filtration member is in fluid communication with said treated water outlet port of said filtration cartridge;
   a membrane attached to said air vent hole, said membrane having at least one hydrophobic side, said hydrophobic side facing the inside of said cartridge sleeve upon attachment; and
   sealing means for forming a water-tight seal between said cyst-reducing filtration member and said cartridge sleeve of said carafe, said sealing means comprising means selected from the group of:
   (i) a gasket permanently attached to an outside periphery of said cyst-reducing filtration member;
   (ii) an annular member having an upper surface and a lower surface permanently connected to an outside periphery of said cyst-reducing filtration member, said annular member having a gasket abutting thereagainst;
   (iii) an annular rim attached proximate to a topmost surface of said cyst-reducing filtration member, said annular rim having an upright edge extending above said surface and receiving a bottom rim of said cartridge sleeve; and
   (iv) an annular member permanently connected to an outside periphery of said cyst-reducing filtration member, said annular member incorporating an integral groove having a gasket securely placed therewithin.

2. The gravity-flow cyst-reducing water filtration device of claim 1, wherein said removable high surface area cyst-reducing filtration member comprises a cellular honeycomb structure having a plurality of channels separated by porous channel walls, wherein said channels traverse said filtration member from a cyst-filled water inlet end to a cyst-removed water outlet end, and include a first plurality of channels open only at said cyst-filled water inlet end and a second plurality of channels open only at said cyst-removed water outlet end.

3. The gravity-flow cyst-reducing water filtration device of claim 2, wherein said cellular honeycomb structure is made of ceramic.

4. The gravity-flow cyst-reducing water filtration device of claim 2, wherein said cellular honeycomb structure further comprises activated carbon.

5. The gravity-flow cyst-reducing water filtration device of claim 1, wherein said membrane is secured to said air vent hole with a waterproof adhesive.

6. The gravity-flow cyst-reducing water filtration device of claim 1, wherein said sealing means is an annular member permanently connected to an outside periphery of said cyst-reducing filtration member having a gasket abutting thereagainst, and wherein said gasket abuts against said upper surface of said annular member.

7. The gravity-flow cyst-reducing water filtration device of claim 1, wherein said sealing means is an annular member permanently connected to an outside periphery of said cyst-reducing filtration member having a gasket abutting thereagainst, and wherein said gasket abuts against said lower surface of said annular member.

* * * * *